Jan. 5, 1926. 1,568,318
F. W. CARLSON
HEAVY DUTY BEARING
Filed Feb. 3, 1925 2 Sheets-Sheet 1
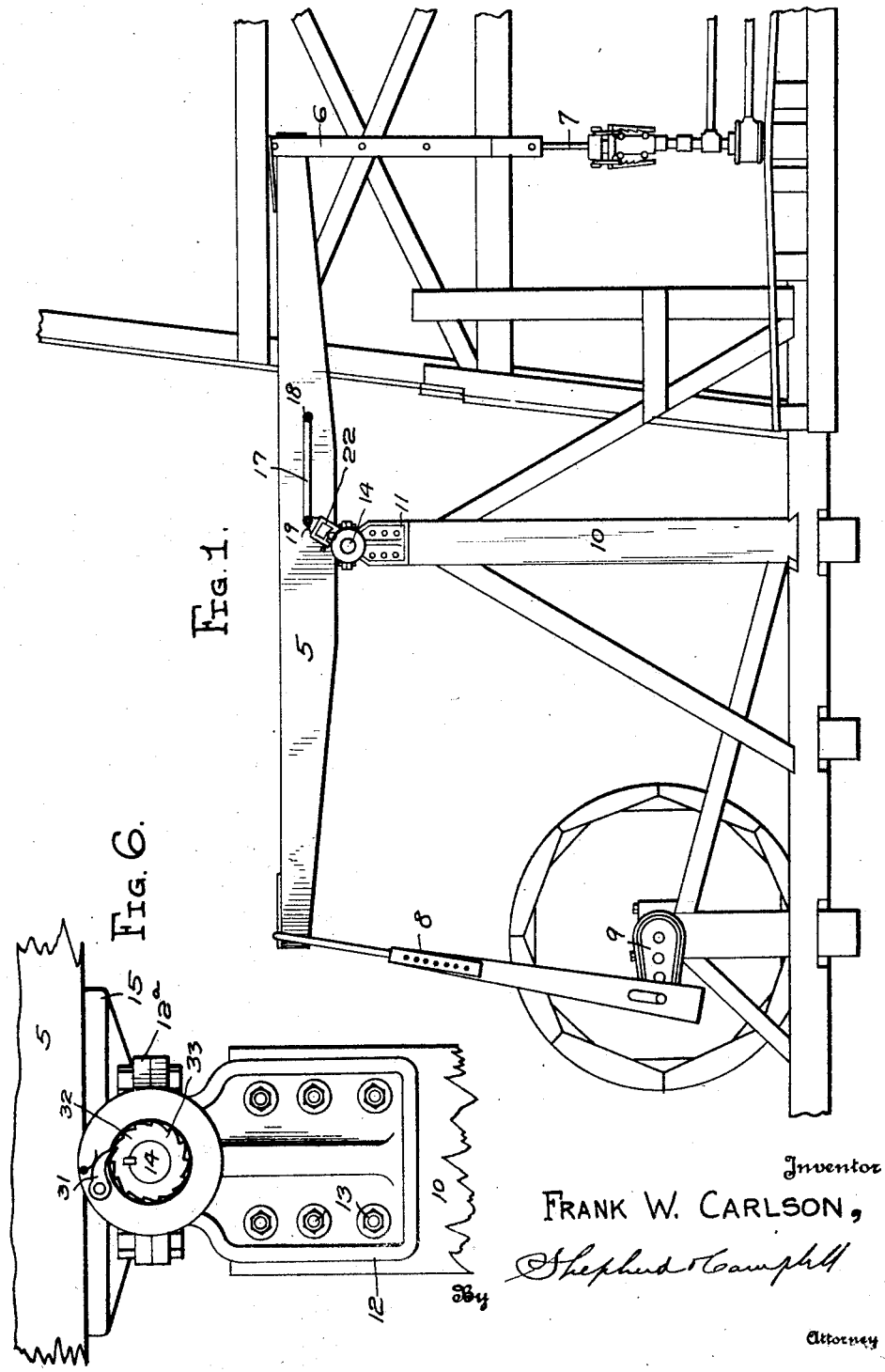
Inventor
FRANK W. CARLSON, Jan. 5, 1926.  1,568,318
F. W. CARLSON
HEAVY DUTY BEARING
Filed Feb. 3, 1925  2 Sheets-Sheet 2
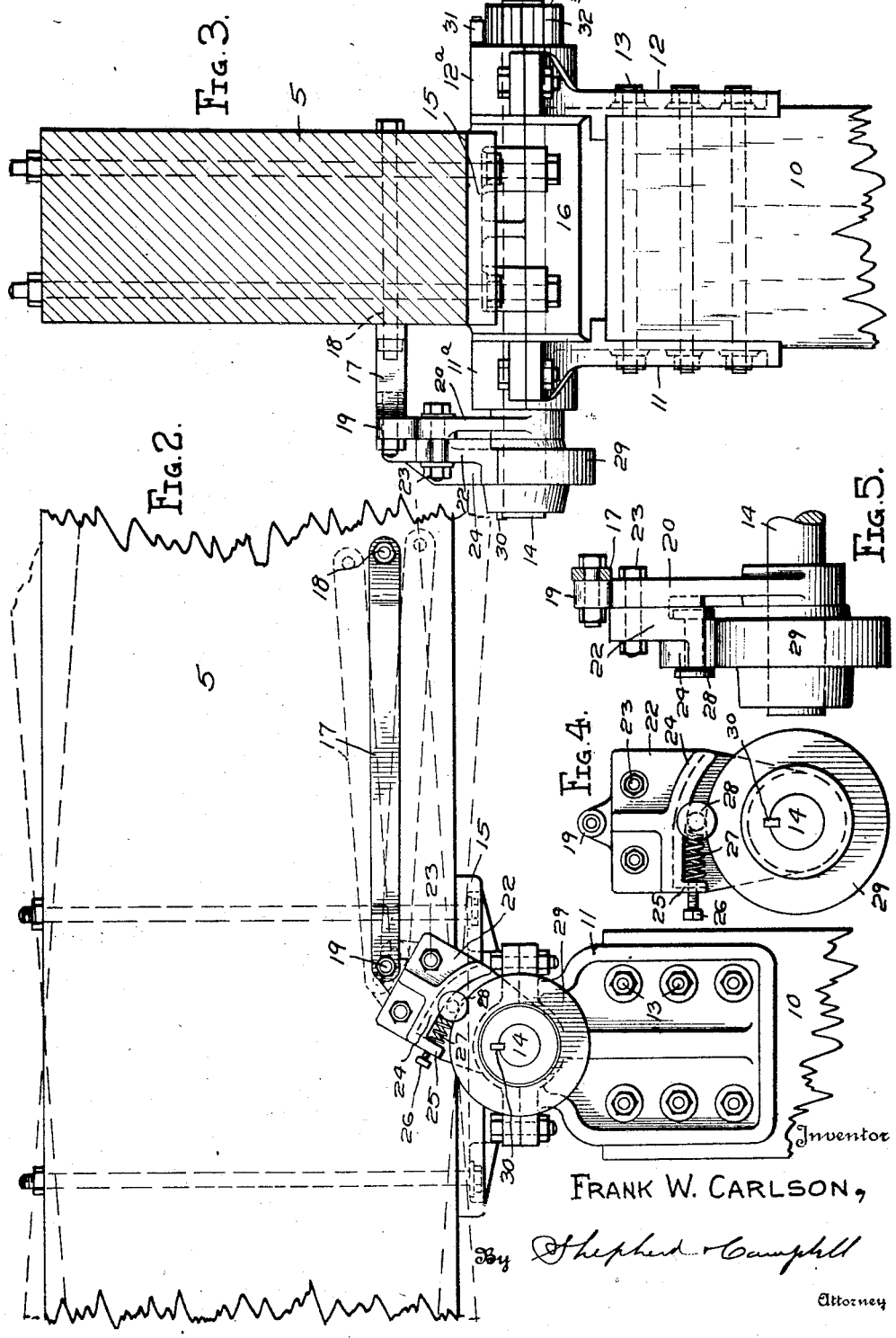
Inventor
FRANK W. CARLSON,
By Shepherd & Campbell
Attorney Patented Jan. 5, 1926.

1,568,318

UNITED STATES PATENT OFFICE.

FRANK WILLIAM CARLSON, OF OILFIELDS, CALIFORNIA.

HEAVY-DUTY BEARING.

Application filed February 3, 1925. Serial No. 6,611.

*To all whom it may concern:*

Be it known that I, FRANK WILLIAM CARLSON, a citizen of the United States, residing at Oilfields, in the county of Fresno and State of California, have invented certain new and useful Improvements in Heavy-Duty Bearings, of which the following is a specification, reference being had therein to the accompanying drawings.

This invention relates to an improvement in a heavy duty bearing. It is designed primarily for use in connection with the bearings for the walking beams of oil wells pumps. However, as the description proceeds it will be seen that the invention is of utility in any relation where an oscillating member is mounted upon a pivot pin.

Further objects and advantages of the invention will be set forth in the detailed description which follows:

In the accompanying drawings:

Figure 1 is a side elevation of an oil well pump rig having the invention applied thereto.

Figure 2 is a side elevation upon an enlarged scale of a part of the walking beam, and the bearing.

Figure 3 is a transverse sectional view of the walking beam with the bearing in elevation.

Figure 4 is a front elevation of a clutch plate hereinafter described.

Figure 5 is an end view of the clutch plate and associated parts, and

Figure 6 is a fragmentary end elevation looking from the opposite side of the walking beam, from that illustrated in Figure 2.

Like numerals designate corresponding parts in all of the figures of the drawing.

The walking beams of oil well pumps as commonly constructed are provided with saddles upon their lower faces which have the bearing pins integral with them. Since the position of these pins does not vary with respect to the walking beam, and the saddles, it follows that the same portion of the pin continuously receives the wear. The result is that these pins become more or less flattened or worn out of "true" upon their under sides. This necessitates a shut down of the pump and the taking of the saddle to the shop to have the pins turned to a new diameter. The side irons and caps constituting the bearings of the pins must then be rebabbitted. After this operation is repeated once or twice, the diameter of the pin has been so reduced that it is no longer safe to use it and the saddle with the pins, is thrown into the scrap-heap.

It is a primary object of the present invention to avoid the waste of material and the loss of time outlined above, by providing bearing pins which may be slowly rotated during the operating of the walking beams, so that no part of the pin will receive more wear than another. This will greatly increase the life of the structure and avoid troublesome and expensive delays.

Referring to the drawings, 5 designates the walking beam of an oil well pump, one end of which is connected by an adjuster 6 with the pump rod 7 and the other end of which is connected by a pitman 8 with the usual operating crank 9. The walking beam 5 is supported upon the Samson post 10 through the medium of the bearings constituting the subject matter of the present invention. This bearing comprises side plates 11 and 12 which are secured by the bolts 13 to the Samson post. The side plates 11 and 12 are provided with the usual caps 11ª, 12ª and constitute the bearings for the shaft or pin 14. This shaft is engaged with the walking beam 5 through the medium of a saddle 15 and saddle cap 16. An offset link 17 has one of its ends pivotally affixed to the walking beam by the bolt 18 and the other end is pivotally connected to the outer end 19, of a swinging lever 20, the latter being mounted upon the shaft 14 but being free to move with respect thereto. The lever 20 has a clutch plate 22 secured to it by bolts 23 and this clutch plate carries a cam or eccentric rib 24 and a lug 25. The lug 25 supports a threaded stud 26 which constitutes a mounting and guide for a spring 27. This spring acts to thrust a roller 28 toward the right in Figure 4 and into contact with the under face of the cam rib 24. This cam rib overlies the periphery of a friction disc 29 which is keyed upon the shaft 14 at 30. Thus if the clutch plate be moved toward the left, in Figure 4, the tendency of the roller 28 to ride into the restricted space between the under side of the cam rib 24 and the periphery of the friction disc 29 will cause the friction disc to move with the face plate and a slight turning movement toward the left will be imparted to the shaft 14. The movement imparted to the shaft is very slight, since the engagement of the link with the walking beam is at such position that the movement of the clutch plate is rendered very small. This is clearly illustrated in Figure 2. However, the slow turning movement imparted to the shaft or pin 14 has the result of constantly presenting a fresh portion of said pin at the point of greatest wear. The pump rods used in oil wells average about one pound per foot so that in a five thousand foot hole the weight that must be borne by the pin 14 is very great. However, these pins are of considerable size, being about four and three-quarter inches in diameter when new and if they can be kept from uneven wear the life of the same will be very considerable.

After the pin has been turned a slight distance as above indicated, a pawl 31 on the side of the walking beam opposite that illustrated in Figure 2, engages a ratchet 32 of a collar 33 which is fastened upon the pin 14 and prevents any possible retrograde movement of the pin, said pawl being supported from bearing plate 12. It is believed that this ratchet is not necessary and that there will be no retrograde movement of the pin. However, if there be such retrograde movement the structure proposed will cure it.

It is to be understood that the invention is not limited to the precise construction set forth but that it includes within its purview whatever changes fairly come within either the terms or the spirit of the appended claims.

Having described my invention, what I claim is:

1. The combination with an oscillatory member, of a pin supporting the same, a friction disc secured to said pin, a face plate, a connection for imparting back and forth swinging movement to said face plate from the oscillatory member, an eccentric surface carried by the face plate and means engageable between the eccentric surface and the friction disc for imparting movement to the friction disc and to the pin in one direction under the influence of said oscillatory member.

2. The combination with a walking beam, a saddle carried thereby, a pin carried by said saddle, a side plate in which said pin is journaled and clutch mechanism engaged with said pin and with the walking beam for imparting a step by step turning movement to said pin in the side plate.

3. In combination a walking beam, a saddle secured thereto, a pin carried by the saddle, a Samson post, bearing plates upon the Samson post in which the pin has its bearing, a link pivoted to the walking beam, a clutch member to which the link is pivoted and a clutch of which said member constitutes a part for imparting a step by step movement to the pin under the influence of the walking beam.

4. The combination with a walking beam, of a saddle carried thereby, a pin upon which the saddle is journaled, fixed bearings for supporting said pin, a clutch engaged with the pin comprising a part swinging circumferentially around the axis of said pin and a link, one end of which is pivotally connected with the walking beam and the other end of which is connected with the swinging clutch part.

In testimony whereof I hereunto affix my signature.

FRANK WILLIAM CARLSON.